United States Patent
Jun

(10) Patent No.: US 7,190,537 B2
(45) Date of Patent: Mar. 13, 2007

(54) SELF-RAID SYSTEM USING HARD DISK DRIVE HAVING BACKUP HEAD AND METHOD OF WRITING DATA TO AND READING DATA FROM HARD DISK DRIVE HAVING BACKUP HEAD

(75) Inventor: Jin-wan Jun, Seoul (KR)

(73) Assignee: Samsung Electronics Co., Ltd., Suwon-Si (KR)

(*) Notice: Subject to any disclaimer, the term of this patent is extended or adjusted under 35 U.S.C. 154(b) by 471 days.

(21) Appl. No.: 10/743,310

(22) Filed: Dec. 23, 2003

(65) Prior Publication Data

US 2004/0179386 A1    Sep. 16, 2004

(30) Foreign Application Priority Data

Dec. 23, 2002  (KR) .................. 10-2002-0082375

(51) Int. Cl.
*G11B 5/86*    (2006.01)
*G11B 15/12*   (2006.01)
*G11B 21/02*   (2006.01)

(52) U.S. Cl. ................... 360/15; 360/63; 360/69; 360/75; 711/114; 711/162

(58) Field of Classification Search .............. None
See application file for complete search history.

(56) References Cited

U.S. PATENT DOCUMENTS 4,423,448 A * 12/1983 Frandsen ............... 360/78.04

| | | | |
|---|---|---|---|
| 6,412,042 B1* | 6/2002 | Paterson et al. | 711/112 |
| 2002/0120812 A1* | 8/2002 | Ageishi et al. | 711/114 |
| 2002/0188800 A1* | 12/2002 | Tomaszewski et al. | 711/112 |
| 2004/0064658 A1* | 4/2004 | Chang | 711/162 |
| 2006/0106981 A1* | 5/2006 | Khurshudov et al. | 711/114 |

FOREIGN PATENT DOCUMENTS

| | | |
|---|---|---|
| JP | 63-76151 | 4/1988 |
| JP | 63076151 | 4/1988 |
| JP | 10-269031 | 10/1998 |

* cited by examiner

*Primary Examiner*—Andrew L. Sniezek
(74) *Attorney, Agent, or Firm*—Staas & Halsey LLP

(57) ABSTRACT

A self-Redundant Array of Inexpensive Disks (RAID) system using a hard disk drive having a backup head and a method of writing data to and reading data from the hard disk drive having the backup head are provided. A self-RAID (Redundant Array of Inexpensive Disks) system using a hard disk drive with at least one writable and readable disk medium includes a spindle motor, heads, an actuator arm, and a controller. The spindle motor rotates the disk medium. The heads face each other above and below the disk medium. The actuator arm drives the heads. The controller controls the heads to write data to and read data from the disk medium using a mode selection signal. The controller examines the mode selection signal, controls a first head which is referred to as a primary head and a second head which is referred to as a backup head to write the same data to and read the same data from the disk medium when the hard disk drive operates under a self-RAID mode, and controls the first head and the second head to write different data to and read different data from the disk medium when the hard disk drive operates under a normal mode.

22 Claims, 6 Drawing Sheets

SELF-RAID SYSTEM USING HARD DISK DRIVE HAVING BACKUP HEAD AND METHOD OF WRITING DATA TO AND READING DATA FROM HARD DISK DRIVE HAVING BACKUP HEAD

CROSS-REFERENCE TO RELATED APPLICATIONS

This application claims the benefit of Korean Patent Application No. 2002-82375, filed on Dec. 23, 2002, in the Korean Intellectual Property Office, the disclosure of which is incorporated herein by reference.

BACKGROUND OF THE INVENTION

1. Field of the Invention

The present invention relates to an electronic writing medium, and more particularly, to a self-RAID (Redundant Array of Inexpensive Disks) system using a hard disk drive having a backup head and a method of writing data to, and reading data from, the hard disk drive having the backup head.

2. Description of the Related Art

With the development of electrical technology, various writing media have been introduced. Among the various writing media, hard disk drives are widely used as large-capacity writing media for high-speed and stable storage.

A hard disk drive includes a plurality of magnetic disks, and a plurality of heads, positioned over, and under, the disks. A head detects magnetic fields of a disk to write data to, or read data from, the disk.

As the capacity of hard disk drives increases, data loss that is caused when malfunction of hard disk drives occurs due to mechanical defects also increases. In an attempt to minimize data that is lost when malfunction of a hard disk drive occurs, data backup systems that backup data in another hard disk drive have been suggested. The data backup systems are referred to as Redundant Array Of Inexpensive Disks (RAID) systems and are used as large-capacity, and low-cost, storage media. Since a set of ten hard disk drives each having a capacity of 10 GB is more economical than a single large-capacity hard disk drive of 100 GB, RAID systems use a set of small-capacity hard disk drives instead of a single large-capacity hard disk drive.

FIG. 1 is a block diagram of a conventional RAID system.

As shown in FIG. 1, after a command is input to the RAID hardware, the RAID hardware controls a data-writing hard disk drive and a backup hard disk drive to perform data write, and read, operations. For example, after a write command is input to the RAID hardware, the RAID hardware writes data to the data-writing hard disk drive and the backup hard disk drive. After a read command is input to the RAID hardware, the RAID hardware reads desired data from the data-writing hard disk drive. If desired data cannot be read from the data-writing hard disk drive, the RAID hardware reads desired data stored in the backup hard disk drive. Such a RAID system uses various methods such as RAID 0, RAID 1, RAID 2, RAID 3, RAID 4, RAID 5, RAID 6, RAID 7, and the like. Thus, by implementing the RAID system as described above, it is possible to provide additional data protection to data conventionally written to only one hard disk drive. That is, even if an error occurs in one hard disk drive, it is possible to prevent data loss by reading the desired data stored in the backup hard disk drive.

However, in order to implement the RAID system, additional hardware is needed to support the operation of the RAID system shown in FIG. 1. In addition, the hard disk drives must be compatible with the additional hardware. Since a plurality of hard disk drives, such as the data-writing hard disk drive and the backup hard disk drive, are needed to implement the RAID system, costs increase.

Accordingly, there exists a need for a low-cost RAID system capable of reliably performing data backup.

SUMMARY OF THE INVENTION

The present invention provides a self-Redundant Array of Inexpensive Disks (RAID) system performing data backup using a single hard disk drive having a backup head.

The present invention also provides a method of writing data to, and reading data from, a single hard disk drive having a backup head.

According to one aspect of the present invention, a self-RAID (Redundant Array of Inexpensive Disks) system using a hard disk drive with at least one writable and readable disk-shaped medium is provided. The self-RAID system comprises a spindle motor that rotates the disk medium, heads that face each other above and below the disk medium, an actuator arm that drives the heads, and a controller that controls the heads to write data to, and read data from, the disk medium using a mode selection signal. The controller examines the mode selection signal, controls a first head, referred to as a primary head, and a second head, referred to as a backup head, to write the same data to, and read the same data from, the disk medium when the hard disk drive operates under a self-RAID mode The controller controls the first head and the second head to write different data to, and read different data from, the disk medium when the hard disk drive operates under a normal mode.

According to an aspect of the present invention, a pair of heads, i.e., the primary head and the backup head, face each other above and below the disk medium. The controller is a microcontroller controlled by firmware, and during a data write operation, the backup head writes data written by the primary head to a backup position that is different from a write position to which the primary head writes data. During a data read operation, if the primary head cannot read data written to the write position, the backup head reads data written to the backup position and the primary head rewrites read data in another write position. In addition, the controller provides a user with information about a malfunction of the primary head and the backup head and defects of the disk-shaped medium, in response to a user's request.

According to another aspect of the present invention, a method is provided of writing data to, and reading data from, a hard disk drive including at least one writable and readable disk-shaped medium, rotated by a spindle motor, and heads, facing each other, above and below the disk-shaped medium, and driven by an actuator arm. The method comprises writing the same data to a write position and a backup position using a first head, referred to as a primary head, and a second head, referred to as a backup head, and reading the data using the primary head. The data is read by the backup head if the primary head cannot read the data, and the data read by the backup head is restored to the write position using the primary head.

According to an aspect of the present invention, before writing and reading data, the method examines a mode selection signal and writes and reads different data using the primary head and the backup head, if the hard disk drive operates under a normal mode. Writing data comprises first writing data to the write position of the disk-shaped medium using the primary head and then writing data written by the primary head to the backup position that is different from the write position using the backup head. Writing data to the write position of the disk-shaped medium using the primary head includes determining whether data has been successfully written, and if a data write operation has not been successfully performed, attempting to write data to another write position that is different from the write position. Writing data written by the primary head to the backup position that is different from the write position using the backup head includes determining whether data has been successfully rewritten, and if the data rewrite operation has failed, informing a user of a malfunction of a head used to write data in response to a user's request.

Reading data comprises reading the data using the primary head, determining whether data has been successfully read, and rewriting the read data if data has been successfully read by using the primary head. If data has not been successfully read using the primary head, the reading data further includes determining whether the primary head has experienced a malfunction, informing the user of the malfunction of the primary head in response to a user's request, and reading the data using the backup head. A malfunction informing operation provides read data if data has been successfully read using the backup head. If data has not been successfully read using the backup head, the reading data further includes determining whether the backup head has experienced a malfunction and informing the user of the malfunction of the backup head in response to a user's request.

Additional aspects and/or advantages of the invention will be set forth in part in the description which follows and, in part, will be obvious from the description, or may be learned by practice of the invention.

BRIEF DESCRIPTION OF THE DRAWINGS

These and/or other aspects and advantages of the invention will become apparent and more readily appreciated from the following description of the embodiments, take in conjunction with the accompanying drawings in which.

DETAILED DESCRIPTION OF THE PREFERRED EMBODIMENTS

Figure 1:
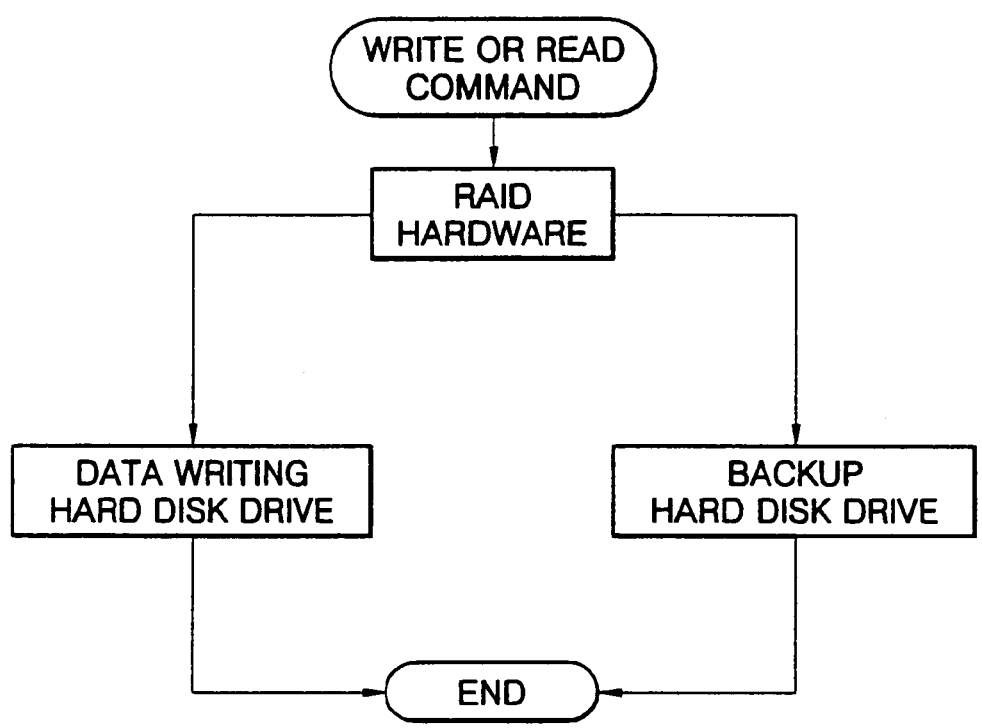
FIG. 1 is a block diagram of a conventional Redundant Array of Inexpensive Disks (RAID) system.

Reference will now be made in detail to the embodiments of the present invention examples of which are illustrated in the accompanying drawings, wherein like reference numerals refer to the like elements throughout. The embodiments are described below to explain the present invention by referring to the figures.

Figure 2:
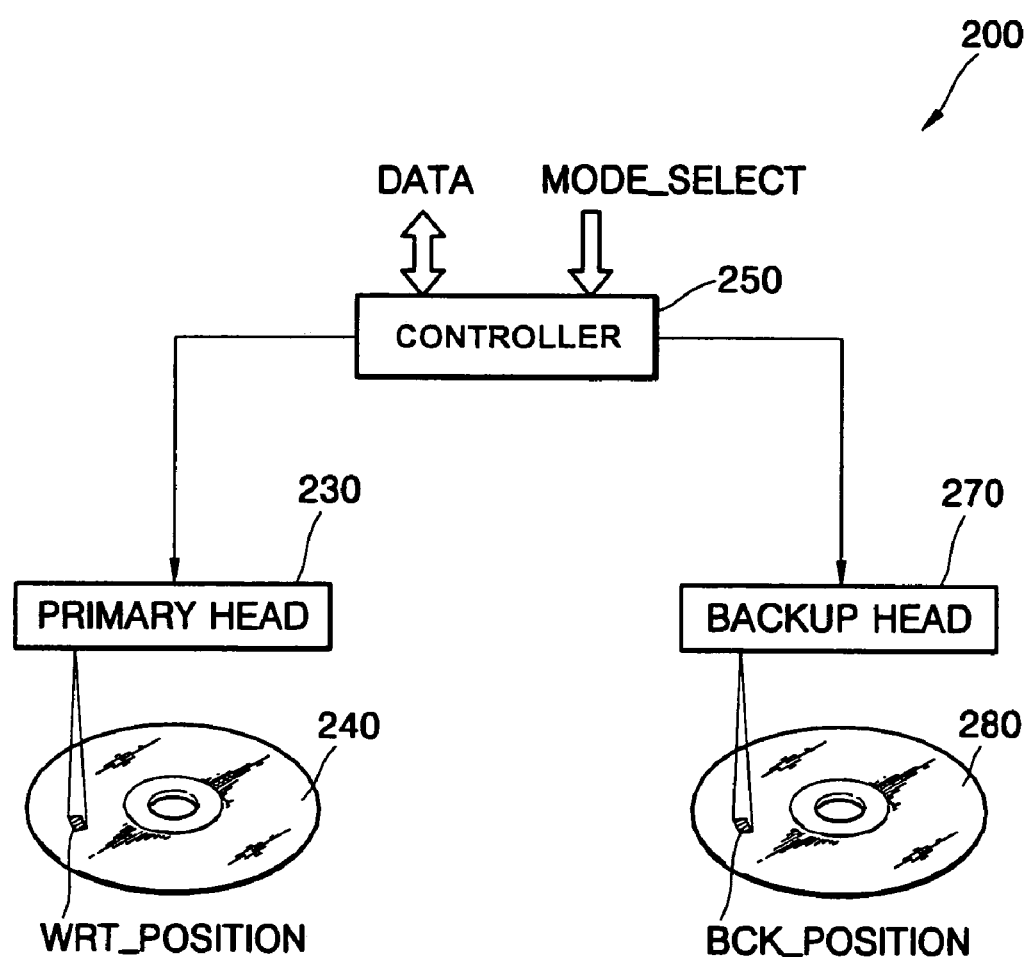
FIG. 2 is a conceptual view of a hard disk drive having a backup head that is used for a self-RAID system, according to an aspect of the present invention.

FIG. 2 is a conceptual view of a hard disk drive 200 having a backup head that is used for a self-RAID system, according to an aspect of the present invention. The hard disk drive 200 of FIG. 2 includes a controller 250, a primary head 230, a backup head 270, a first disk medium 240, and a second disk medium 280. It is to be noted that FIG. 2 schematically illustrates the hard disk drive 200 for convenience of explanation.

The controller 250 controls the primary head 230 and the backup head 270, such that the primary head 230 writes data to, or reads data from, the first disk medium 240, and the backup head 270 writes data to, or reads data from, the second disk medium 280. More specifically, in a data write operation, the controller 250 inputs received data to the primary head 230 and the backup head 270. Then the primary head 230 and the backup head 270 store input data in the first disk medium 240 and the second disk medium 280, respectively. According to an aspect of the present invention, backup head 270 writes data to a backup position $BCK_{13}$ POSITION that is different from a write position $WRT_{13}$ POSITION to which the primary head 230 writes data. In a data read operation, the controller 250 detects the write position $WRT_{13}$ POSITION of the first disk medium 240 in which desired data is stored and reads desired data by using the primary head 230. If the primary head 230 cannot read data from the write position $WRT_{13}$ POSITION of the first disk medium 240, the controller 250 detects the backup position $BCK_{13}$ POSITION in which data is backed up and reads data stored in the backup position $BCK_{13}$ POSITION by using the backup head 270. The primary head 230 rewrites the backup data read by the backup head 270 to the write position $WRT_{13}$ POSITION to restore the backup data by using the primary head 230.

As shown in FIG. 2, the hard disk drive 200 used in the self-RAID system writes data that is input from an external device to two different positions, i.e., the write position $WRT_{13}$ POSITION and the backup position $BCK_{13}$ POSITION, using the primary head 230 and the backup head 270. Thus, even when data written to one of the positions is damaged, it is possible to restore damaged data by reading data written to the other position.

The controller 250 may be a microcontroller controlled by firmware. In this case, the microcontroller detects a mode selection signal $MODE_{13}$ SELECT and controls the hard disk drive 200 to operate under a RAID mode or a normal mode. In addition, if the controller 250 is a microcontroller controlled by firmware, the hard disk drive 200 can achieve a self-RAID system without including additional hardware required for a RAID outside the hard disk drive 200. Since control over the primary head 230 and the backup head 270 is carried out by the controller 250 within the hard disk drive 200, it is not necessary for an external device of the hard disk drive 200 to recognize whether or not the hard disk drive 200 operates under a RAID mode. Also, a user can operate the hard disk drive 200 under the self-RAID mode or the normal mode, using the mode selection signal $MODE_{13}$ SELECT and convert one operation mode of the hard disk drive 200 into the other even after selecting one of the modes.

Aspects of the present invention are not limited to the, configuration of the hard disk drive 200 of FIG. 2. Thus, it should be understood that additional aspects of the present invention include a hard disk drive 200 having an additional backup head in addition to the primary head and that writes data to, and reads data from, different positions. For example, aspects of the invention are not limited to that shown in FIG. 2, where the first disk medium 240 and the second disk medium 280 are shown as separate media. The primary head 230 and the backup head 270 can also be achieved at the upper and lower portions of one disk-shaped medium, as shown in FIG. 3.

Figure 3:
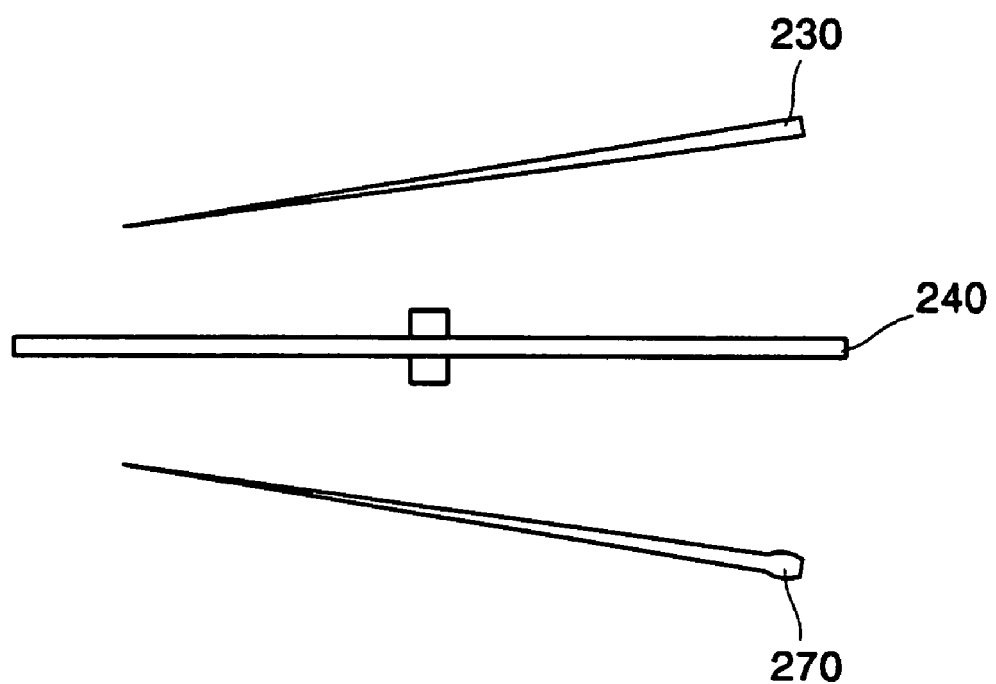
FIG. 3 illustrates an arrangement of a primary head and a backup head of the hard disk drive of FIG. 2.

FIG. 3 illustrates an arrangement of the primary head 230 and the backup head 270 of the hard disk drive 200 of FIG. 2. Referring to FIG. 3, the primary head 230 and the backup head 270 are arranged over and under, respectively the first disk medium 240.

In FIG. 3, the primary head 230 and the backup head 270 are shown as arranged over and under respectively one disk-shaped medium, but they can be alternatively configured as long as the backup head 270 can write data to a position different from where the primary head 230 writes data.

Figure 4:
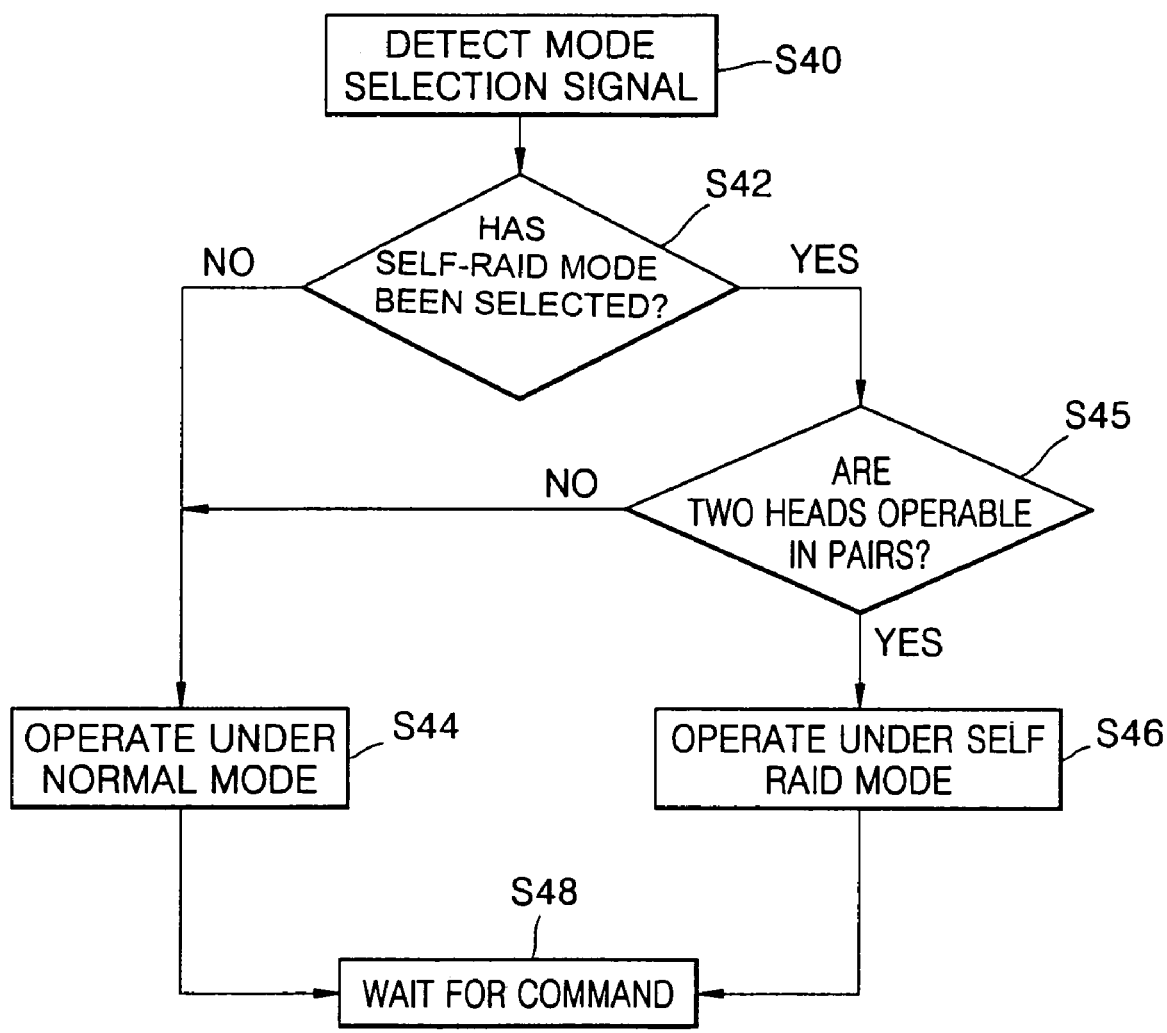
FIG. 4 is a flowchart for explaining a mode change of the hard disk drive using a mode selection signal.

FIG. 4 is a flowchart for explaining a mode change of the hard disk drive 200 using the mode selection signal $MODE_{13}$ SELECT.

The mode selection signal $MODE_{13}$ SELECT is first detected (S40). Then, it is determined whether a user selects a self-RAID mode (S42) by examining the detected mode selection signal $MODE_{13}$ SELECT. If the user selects the normal mode, the hard disk drive operates under the normal mode (S44). The hard disk drive is directed to drive a plurality of heads included in the hard disk drive to write and read different data. Thus, when the hard disk drive operates under the normal mode, the user uses the entire storage capacity of a disk-shaped medium to write data to the disk-shaped medium.

If the user selects the self-RAID mode, the controller determines whether two heads are operable in pairs (S45). Here, two heads denote the backup head and the primary head. If these heads cannot write or read the same data, the hard disk drive cannot operate under the self-RAID mode even if the user selects the self-RAID mode. In addition, if one of the heads has an error, the two heads cannot operate in pairs. In this case, the hard disk drive operates under the normal mode.

If the two heads can operate in pairs, the hard disk drive operates under the self-RAID mode (S46), which means that the hard disk drive groups heads in pairs and drives a pair of heads to write and read the same data. Where the hard disk drive operates under the self-RAID mode (S46), the storage capacity of the hard disk drive is set to half of the total storage capacity, since the total storage capacity of the hard disk drive is not used and instead the same data is written twice, once by the primary head and once by the backup head. Since the user can store valuable data and the backup thereof during the self-RAID mode, it is possible to minimize data loss.

After the user has selected the operation mode of the hard disk drive, the controller waits for an externally input command (S48).

As shown in FIG. 4, the user can select the operation mode of the hard disk drive. Thus, if the priority of the user is capacity, the whole capacity can be used for the data write operation. If the priority of the user is stability of data, the user selects the self-RAID mode, such that the hard disk drive operates under the self-RAID mode. Once the user selects the operation mode of the hard disk drive as shown in FIG. 4, the controller of the hard disk drive controls the operation mode of the hard disk drive. Thus, the hard disk drive can be used by using other methods.

Figure 5:
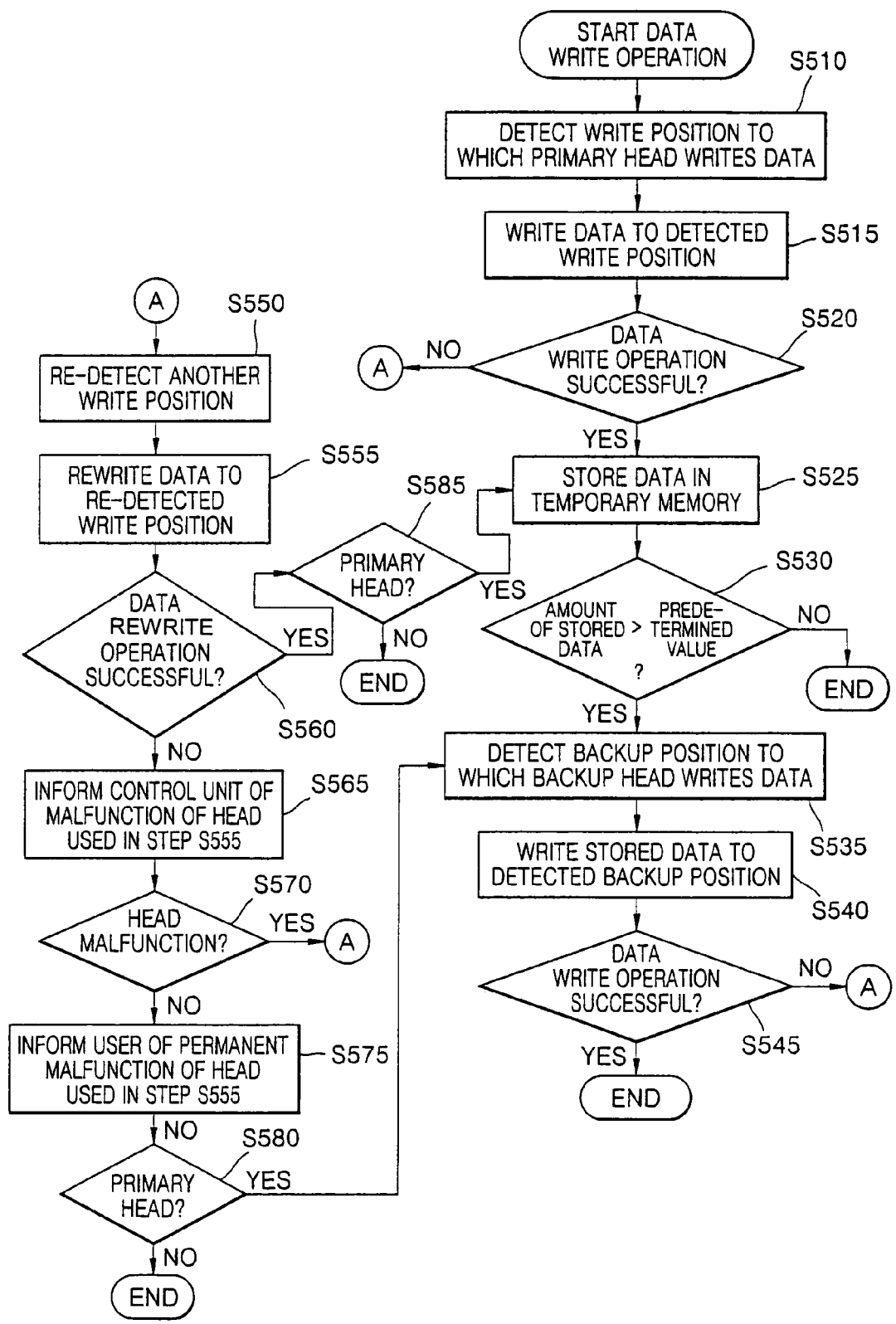
FIG. 5 is a flowchart describing a method of writing data to the hard disk drive having the backup head according to another aspect of the present invention.

FIG. 5 is a flowchart describing a method of writing data to the hard disk drive having the backup head according to another aspect of the present invention.

Once the data write operation starts, a write position to which the primary head writes data is detected (S510). Once the write position is detected, data is stored in the write position (S515). In operation S520, it is determined whether data has been successfully written to the write position by the primary head. If so, data is stored in a temporary memory (S525). The temporary memory is a cache memory, in which data is temporarily stored. To reduce overuse of heads in storing a small amount of data, data is temporarily stored in the cache memory, and then only data whose amount exceeds a predetermined value is written to a disk-shaped medium at a time. Thus, in operation S530, it is determined whether the amount of data stored in the cache memory exceeds the predetermined value. If so, the backup position to which data stored in the cache memory is to be written is detected by using the backup head in operation S535. If the amount of data stored in the cache memory does not exceed the predetermined value, data backup is not performed until the amount of data stored in the cache memory exceeds the predetermined value. Data stored in the cache memory is written to the detected backup position (S540). In operation S545, it is determined whether data has been successfully written to the detected backup position.

As a result of determining in operations S520 and S545 whether data has been successfully written to the detected write position and backup position, if data has not been successfully written to the detected write position and backup position, another write position is re-detected in operation S550. The re-detected write position may replace the write position detected in operation S510 or the backup position detected in operation S535, based on whether data to be rewritten is the original data or the backup data. If the data write operation has failed in operation S520, and thus, another write position is re-detected in operation S550, the re-detected write position replaces the write position detected in operation S510.

If the data write operation has failed in operation S545, and thus, another write position is re-detected in operation S550, the re-detected write position replaces the backup position detected in operation S535. After re-detection has been completed, data is written to the re-detected write position in operation S555. If data is written to the re-detected write position instead of the write operation detected by the primary head in operation S510, such data corresponds to the original data and is written by the primary head. Whereas, if data is written to the re-detected write position instead of the backup position detected by the backup head in operation S535, such data corresponds to the backup data and is written by the backup head.

After the original data or the backup data is written to the re-detected write position, it is determined whether data has been successfully written in operation S560. If so, in operation S585, it is determined whether data is written by the primary head or the backup head. If the primary head is used for the data write operation, data is stored in the temporary memory for data backup in operation S525. If the backup head is used for the data write operation, the data write operation is completed because data backup has been carried out.

As a result of the determination of operation S560, if the data write operation has failed, the controller is informed of the temporary malfunction of the head used in operation S565. Then, in operation S570, the controller checks whether the head used in operation S565 is broken down so as to determine whether the head can perform the data write operation after time passes. If the head is not broken down, the process proceeds to operation S550 to attempt the data write operation again. If the head is broken down, the controller informs the user of a permanent malfunction of the head used in operation S575. Checking whether the head used for the data write operation has experienced the temporary malfunction or is broken down can be carried out by using a conventional method such as a bit error rate (BER) testing in data transmission. However, a method of checking whether the head has experienced the temporary malfunction or is broken down is not included in the technical scope of the present invention, and thus, may have many different forms.

If the head has a fatal malfunction in operation S570, it is determined whether the head is the primary head in operation S580. If the head experiencing the fatal malfunction is the primary head, the process proceeds to operation S535 to write data using the backup head. If the head experiencing the fatal malfunction is the backup head, the backup operation is completed.

As shown in FIG. 5, according to an aspect of the present invention, the primary head and the backup head simultaneously write the same data, and it is determined whether data write operations performed by the primary head and the backup head have been successful. Thus, if any data write operation has failed, an attempt to rewrite data in another write position is made. If the attempt fails, the controller is informed of a temporary malfunction of the head used in that write operation. Then the controller attempts the write operation again after a predetermined time. Thus, it is possible to perform a stable data write operation.

Figure 6:
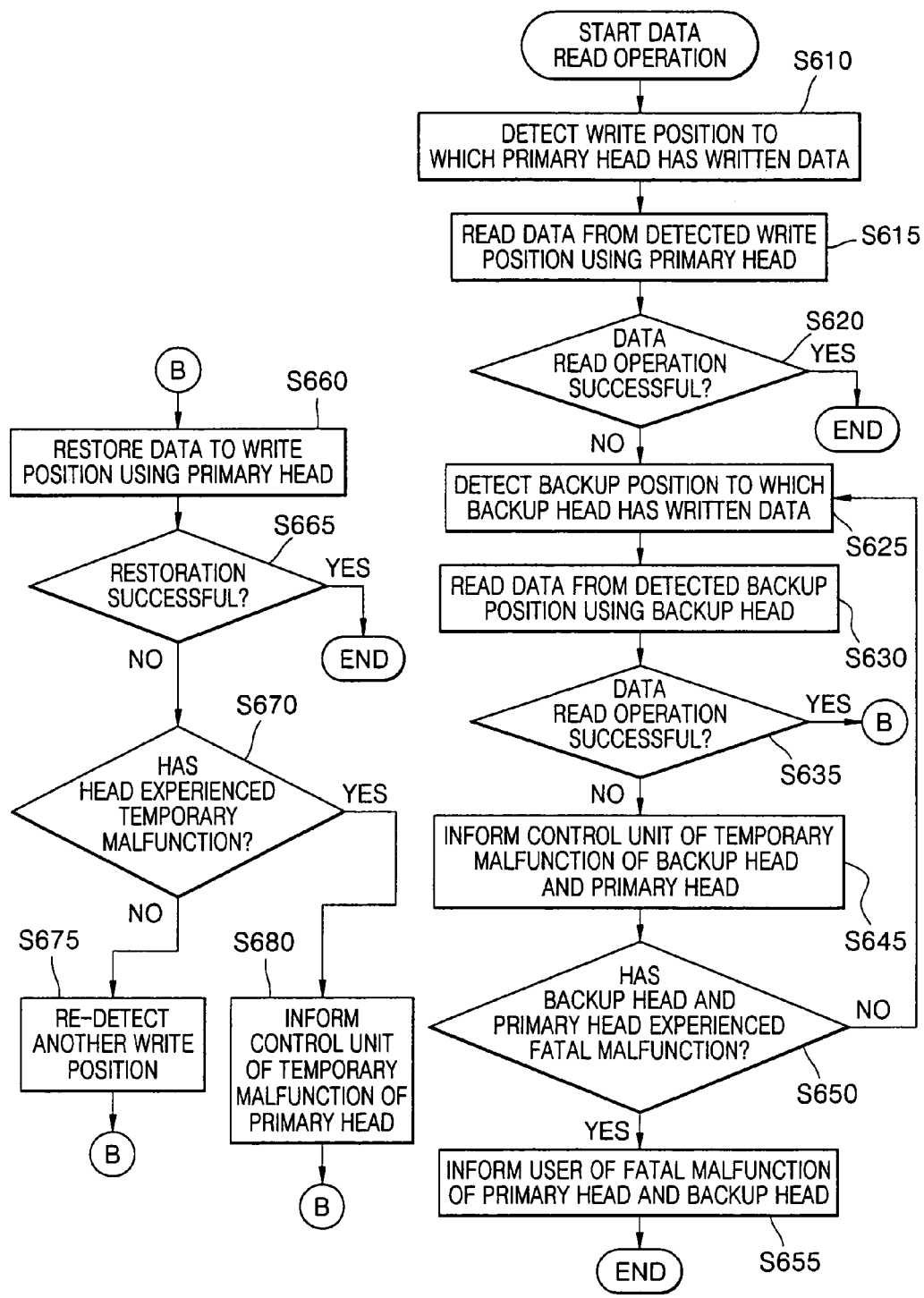
FIG. 6 is a flowchart describing a method of reading data from the hard disk drive having the backup head according to another aspect of the present invention.

FIG. 6 is a flowchart describing a method of reading data from the hard disk drive having the backup head according to another aspect of the present invention.

In the data read operation, the write position to which the primary head has written data is detected in operation S610. After the write position has been detected, data is read by the primary head from the detected write position (S615). In operation S620, it is checked whether data has been successfully read. Determination of whether data has been successfully read can be performed by various methods including parity bit testing. If data has been successfully read in operation S615, the data read operation is completed. If the data read operation has failed, the backup position to which the backup head has written data is detected (S625). After the backup position has been detected, the backup head reads data from the detected backup position (S630). In addition, in operation S635, it is checked whether data has been successfully read in operation S630. If data has not been successfully read using the backup head, the controller is informed of a temporary malfunction of the primary head and the backup head in operation S645. As described above, determination of whether the head has experienced a malfunction can be performed by various methods. In operation S650, it is determined whether the head has experienced a fatal malfunction. If so, the user is informed of the fatal malfunction of the head (S655). If the head is experiencing a temporary malfunction rather than a fatal malfunction, the process proceeds to operation S625 to detect the backup position by using the backup head.

If desired data has not been read using the primary head but has been read using the backup head, the read data is restored to the write position using the primary head (S660). In operation S665, it is determined whether data restoration has been successfully performed in operation S660, and if the data has been successfully restored, a data read operation is completed. By contrast, if data restoration has failed, it is determined in operation S670 whether the primary head is experiencing a temporary malfunction. If the primary head is experiencing the temporary malfunction, the controller is informed of the temporary malfunction of the primary head in operation S680 and attempts restoration again in operation S660. If the primary head does not experience a temporary malfunction, another write position is detected in operation S675 to store data read by the backup head, and then, an attempt to write data is made in operation S660.

During the data read operation shown in FIG. 6, restoration of the backup data, read by the backup head, using the primary head is repeated until it is successfully performed. If restoration fails repeatedly, a restoration routine may be repeated unlimited times. Thus, it is possible to preset the number of repetition of the restoration routine.

A method of writing data to and reading data from a hard disk drive having a plurality of backup heads according to an aspect of the present invention includes determining whether the primary head and the backup head are experiencing a fatal malfunction and informing a user of such fatal malfunction. Thus, the user can monitor the state of the hard disk drive.

According to other aspects of the invention, a unit of the self-RAID system is a computer implementing the methods shown in FIGS. 4–6 using data encoded on a computer-readable medium.

As described above, it is possible to stably perform data backup at low costs using a self-RAID system that backs up data in the hard disk drive.

In addition, it is possible to implement a stable self-RAID system without the need for separate RAID hardware.

Although a few embodiments of the present invention have been shown and described, it would be appreciated by those of skilled in the art that changes may be made in this embodiment without departing from the principles and spirit of the invention, the scope of which defined in the claims and their equivalents. For instance, determination of whether data read and write operations have been successful is not necessarily carried out by parity bit testing.

What is claimed is:

1. A self-RAID (Redundant Array of Inexpensive Disks) system, the self-RAID system comprising:
   a hard disk drive with at least one writable and readable disk medium;
   a spindle motor rotating the at least one disk medium;
   a plurality of heads;
   an actuator arm driving the heads; and
   a controller controlling the heads to write data to and read data from the at least one disk medium using a mode selection signal,
   wherein the controller examines the mode selection signal, controls a first head and a second head of the plurality of heads to write the same data to and read the same data from the at least one disk medium when the hard disk drive operates under a self-RAID mode, and controls the first head and the second head of the plurality of heads head to write different data to and read different data from the at least one disk medium when the hard disk drive operates under a normal mode,
   wherein the first head is a primary head and the second head is a backup head, and
   wherein the controller is a microcontroller controlled by firmware, and during a data write operation, the backup head writes data written by the primary head to a backup position that is different from a write position to which the primary head writes data whereas during a data read operation, if the primary head cannot read data written to the write position, the backup head reads data written to the backup position and the primary head rewrites read data in another write position.

2. The self-RAID system according to claim 1, wherein the first head and the second head are positioned on opposite sides of one disk medium and oppose each other.

3. The self-RAID system according to claim 1, wherein the first head is positioned on a first one of the at least one disk medium and the second head is positioned on a second one of the at least one disk medium.

4. The self-RAID system according to claim 1, wherein the controller provides a user with information about a malfunction of the primary head and the backup head and defects of the disk-shaped medium, in response to a user request.

5. A method of writing data to and reading data from a hard disk drive, the method comprising:
   writing the same data to a write position and a backup position using a primary head and a backup head;
   reading the data using the primary head, wherein the data is read by the backup head if the primary head cannot read the data after a predetermined time; and
   restoring the data read by the backup head to the write position using the primary head.

6. The method according to claim 5, further comprising:
   examining a mode selection signal before the writing of the same data and the reading the data; and
   writing and reading different data using the primary head and the backup head if the hard disk drive operates under a normal mode.

7. The method according to claim 6, wherein the writing the data comprises:
   writing the data to the write position using the primary head, and
   writing the data written by the primary head to the backup position that is different from the write position using the backup head.

8. The method according to claim 7, wherein the writing the data to the write position comprises:
   determining whether the data has been successfully written, and
   rewriting the data to another write position that is different from the write position after a predetermined time if the writing the data has not been successfully performed.

9. The method according to claim 7, wherein the writing the data written by the primary head to the back up position comprises:
   determining whether the data has been successfully rewritten, and
   informing a user of a malfunction of the head used to write data in response to a user request and if the rewrite of the data has failed.

10. The method according to claim 7, wherein the reading of the data comprises:
    reading the data using the primary head;
    determining whether the data has been successfully read;
    rewriting and providing the read data if the data has been successfully read by using the primary head.

11. The method according to claim 10, further comprising:
    determining whether the primary head has experienced a malfunction after a predetermined time if the data has not been successfully read using the primary head;
    informing the user of the malfunction of the primary head in response to the user request;
    reading the data using the backup head; and
    informing of a malfunction providing the read data if the data has been successfully read using the backup head.

12. The method according to claim 11, further comprising:
    determining whether the backup head has experienced a malfunction after a predetermined time if the data has not been successfully read using the backup head; and
    informing the user of the malfunction of the backup head in response to the user's request.

13. The method according to claim 10, wherein the restoring of the data comprises:
    restoring the data that has been successfully read by the backup head to the write position using the primary head;
    determining whether restoration of the data has been successfully performed;
    re-restoring the data to another write position that is different from the write position if restoration of the data has failed; and
    determining whether the primary head has experienced a malfunction and informing the user of the malfunction of the primary head in response to a user request.

14. A computer-readable medium encoded with processing instructions implementing a method of writing data to, and reading data from, a hard disk drive, the method comprising:
    writing the same data to a write position and a backup position using a backup head;
    reading the data using the primary head, wherein the data is read by the backup head if the primary head cannot read the data after a predetermined time; and
    restoring the data read by the backup head to the write position using the primary head.

15. A self-RAID (Redundant Array of Inexpensive Disks) system, comprising:
    a spindle motor;
    a first head and a second head;
    an actuator arm driving the heads; and
    a controller controlling the heads to write and read data according to a mode selection signal,
    wherein the controller controls the first head and the second head to write and read the same data when the mode selection signal indicates a self-RAID mode, and controls the first head and the second head to write and read different data when the mode selection signal indicates a normal model,
    wherein the first and the second heads are positioned above and below one disk medium and oppose each other, and
    wherein the second head writes data, written by the first head, to a second position that is different from a first position to which the first head writes data, and during a data read operation, if the first head cannot read data written to the first position, after a predetermined time the second head reads data written to the second position and the first head rewrites the read data in another write position.

16. The self-RAID system according to claim 15, wherein the first head is a primary head and the second head is a backup head.

17. A method of writing data to a hard disk having a primary head and a backup head, comprising:
    detecting a write position to which the primary head writes the data;
    writing the data to the detected write position;
    storing the data in a temporary memory;
    detecting a backup position to which the backup head writes the data; and
    writing the stored data to the detected backup positions,
    wherein the detecting the backup position comprises detecting a backup position to which the backup head writes the data only if the amount of stored data is less than a predetermined value.

18. A method of writing data to a hard disk having a primary head and a backup head, comprising:
  detecting a write position to which the primary head writes the data;
  writing the data to the detected write position;
  storing the data in a temporary memory;
  detecting a backup position to which the backup head writes the data;
  writing the stored data to the detected backup position;
  upon unsuccessful data writing to the detected backup position, redetecting another write position; and
  rewriting the data to the re-detected write position.

19. The method according to claim 18, further comprising storing the data in the temporary memory if the data is rewritten to the redetected write position.

20. The method according to claim 18, further comprising if the data is not rewritten to the redetected write position, informing a user of a head malfunction after a predetermined time;
  detecting backup position to which the backup head writes the data; and
  writing the stored data to the detected backup position.

21. A method of reading data from a hard disk having a primary head and a backup head, comprising:
  detecting a write position to which a primary head has written the data;
  reading the data from the detected write position using the primary head;
  detecting a backup position to which a backup head has written the data after a predetermined time, if the data is not read from the primary head;
  reading the data from the detected backup position using the backup head;
  informing a control unit of a malfunction of the primary head and the backup head upon the data not read from the backup position after a predetermined time; and
  restoring the data to the write position using the primary head.

22. The method according to claim 21 further comprising:
  if the data is not restored, determining if the primary head has experience a temporary malfunction; and
  re-detecting another write position if no temporary malfunction is detected or information the control unit of the temporary malfunction if the malfunction is detected.

* * * * *

UNITED STATES PATENT AND TRADEMARK OFFICE
CERTIFICATE OF CORRECTION

PATENT NO. : 7,190,537 B2
APPLICATION NO. : 10/743310
DATED : March 13, 2007
INVENTOR(S) : Jin-Wan Jun It is certified that error appears in the above-identified patent and that said Letters Patent is hereby corrected as shown below:

Column 10, Line 42, change "model," to --mode,--.

Column 10, Line 65, change "positions," to --position,--.

Signed and Sealed this

Nineteenth Day of June, 2007

JON W. DUDAS
*Director of the United States Patent and Trademark Office*